United States Patent
Tegethoff

(10) Patent No.: US 9,772,918 B2
(45) Date of Patent: *Sep. 26, 2017

(54) METHOD FOR CONNECTING AN INPUT/OUTPUT INTERFACE OF A TESTING DEVICE EQUIPPED FOR TESTING A CONTROL UNIT

(71) Applicant: dSPACE digital signal processing and control engineering GmbH, Paderborn (DE)

(72) Inventor: Marc Tegethoff, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 99 days.

This patent is subject to a terminal disclaimer.

(21) Appl. No.: 14/842,123

(22) Filed: Sep. 1, 2015

(65) Prior Publication Data

US 2016/0062861 A1    Mar. 3, 2016

(30) Foreign Application Priority Data

Sep. 1, 2014  (EP) .................................... 14183024

(51) Int. Cl.
*G06F 11/00* (2006.01)
*G06F 11/26* (2006.01)
(Continued)

(52) U.S. Cl.
CPC ............ *G06F 11/261* (2013.01); *G05B 17/02* (2013.01); *G06F 11/221* (2013.01); (Continued)

(58) Field of Classification Search
CPC ..... G06F 11/221; G06F 11/261; G06F 11/263
(Continued)

(56) References Cited

U.S. PATENT DOCUMENTS 5,940,783 A * 8/1999 Kukutsu ............ G01R 31/3185
                                                       702/120
7,050,923 B2   5/2006 Fuller, III et al.
(Continued)

FOREIGN PATENT DOCUMENTS

CN           1489306 A        4/2004
CN         101197734 A        6/2008
(Continued)

OTHER PUBLICATIONS

European Patent Office, "Search Report", dated Feb. 26, 2015.
Chinese Office Action for Chinese Application No. 201510550016.4 dated Jul. 3, 2017 with English translation.

*Primary Examiner* — Elmira Mehrmanesh
(74) *Attorney, Agent, or Firm* — Muncy, Geissler, Olds & Lowe, P.C.

(57) ABSTRACT

A method for connecting an input/output interface of a testing device equipped for testing a control unit to a model of a technical system present in the testing device. The interface connects the control unit to be tested or connects a technical system to be controlled; the model to be connected to the input/output interface is a model of the technical system to be controlled or a model of the control unit to be tested. The testing device has a plurality of input/output functions connected to the model and provides an interface hierarchy structure and a function hierarchy structure. The method has an automatic configuration of compatible connections between the interface hierarchy structure and the function hierarchy structure so that the model present in the testing device communicates through the compatible connections with the control unit to be tested or the technical system to be controlled.

16 Claims, 10 Drawing Sheets

(51) Int. Cl.
*G05B 17/02* (2006.01)
*G06F 11/22* (2006.01)

(52) U.S. Cl.
CPC .............. *G05B 2219/23445* (2013.01); *G05B 2219/23446* (2013.01); *G05B 2219/23451* (2013.01)

(58) Field of Classification Search
USPC ..................................................... 714/28, 30
See application file for complete search history.

(56) References Cited

U.S. PATENT DOCUMENTS

| | | | |
|---|---|---|---|
| 7,089,530 B1 * | 8/2006 | Dardinski | G05B 15/02 700/83 |
| 7,134,090 B2 | 11/2006 | Kodosky et al. | |
| 7,367,028 B2 | 4/2008 | Kodosky et al. | |
| 7,478,337 B2 | 1/2009 | Kodosky et al. | |
| 7,877,153 B2 * | 1/2011 | Biermann | G05B 19/0426 700/17 |
| 8,381,212 B2 | 2/2013 | Brelsford et al. | |
| 9,147,015 B2 * | 9/2015 | Ruehl | G06F 17/5009 |
| 2003/0171905 A1 | 9/2003 | Wagner et al. | |
| 2004/0071094 A1 | 4/2004 | Holma et al. | |
| 2005/0257194 A1 * | 11/2005 | Morrow | G06F 8/34 717/109 |
| 2010/0114619 A1 * | 5/2010 | Birsan | G06Q 10/06 705/7.11 |
| 2013/0055279 A1 | 2/2013 | Sistare | |
| 2013/0086127 A1 | 4/2013 | Pogmore | |
| 2013/0090886 A1 * | 4/2013 | Pueschl | G05B 17/02 702/113 |
| 2013/0304448 A1 * | 11/2013 | Ruehl | G06F 17/50 703/13 |
| 2014/0207994 A1 | 7/2014 | Cherkaoui et al. | |
| 2015/0149944 A1 * | 5/2015 | Franzen | G06F 3/0484 715/771 |

FOREIGN PATENT DOCUMENTS

| | | |
|---|---|---|
| CN | 103139822 A | 6/2013 |
| DE | 10 2013 100 603 B3 | 5/2014 |
| WO | WO 01/60023 A1 | 8/2001 |
| WO | WO 02065220 A1 | 8/2002 |

\* cited by examiner

METHOD FOR CONNECTING AN INPUT/OUTPUT INTERFACE OF A TESTING DEVICE EQUIPPED FOR TESTING A CONTROL UNIT

This nonprovisional application claims priority under 35 U.S.C. §119(a) to European Patent Application No. EP 14183024, which was filed on Sep. 1, 2014, and which is herein incorporated by reference.

BACKGROUND OF THE INVENTION

Field of the Invention

The present invention relates to the development of control units, such as are used in the automotive industry or in the aviation industry, for example, for controlling technical systems such as, e.g., engines or brakes. Also, the present invention relates to testing devices that are used in the development process for the control unit.

Description of the Background Art

The development of control units has become a highly complex process. New control units and new control functions should thus be tested as early in the development process as possible in order to verify general functionality and to set the direction for further development. Towards the end of the development process, it is important to test the control unit, which has already undergone extensive development, as comprehensively as possible in order to make necessary modifications based on the test results before the control unit comes into use or enters mass production, so that it functions as desired under all conditions in later operation.

Two exemplary steps of the development process in which testing devices are used for testing the control unit are described below. So-called hardware-in-the-loop simulators (HIL simulators) are employed at a fairly late stage of the development process. Such HIL simulators contain a model of the technical system to be controlled, with the model being present in software. The HIL simulator also contains an input/output interface to which it is possible to connect the control unit, which has already undergone extensive development and is physically present as hardware. The functionality of the control unit can now be tested in various simulation passes, wherein it is possible to observe how the model of the technical system to be controlled reacts to the signals of the control unit, and how the control unit reacts to the events predefined by the model of the technical system to be controlled. In this process, it is possible to simulate not only normal operation, but also faults in the technical system to be controlled as well as faults in the control unit.

In contrast, so-called rapid control prototyping (RCP) is a development step that takes place more toward the start of the development process. In RCP, the testing device is used in the role of the control unit. The testing device contains a model of the control unit to be tested. Because of the early stage of development, the model of the control unit to be tested is still fairly rudimentary in comparison to the later, final control unit. Nor is any hardware implementation of the control unit normally in existence yet; instead, the model of the control unit to be tested that is present in the testing device is a software model. The testing device can be connected through an input/output interface to the technical system to be controlled itself, or to the control unit that exists to date for the technical system to be controlled. In the first case, there is a direct connection between the control unit to be tested, in the form of a software model, and the technical system to be controlled, which is physically present. In the second case, the control unit that exists to date is the technical system to be controlled by the RCP testing device. This control of the control unit that exists to date results in a modification of the control method of the control unit that exists to date, making it possible to test new control functionality by means of the externally connected RCP testing device.

In both examples cited (HIL simulator and RCP testing device), there is a testing device in which a model is present, and this testing device must be connected to an external device through the input/output interface so that the test can be performed. In the case of RCP, the testing device contains a model of the control unit to be tested, and is connected to the technical system to be controlled. In the case of HIL, the testing device contains a model of the technical system to be controlled, and is connected to the control unit to be tested. In both cases, a testing device equipped for testing the control unit is provided, wherein in one case the control unit is tested as a model, and in the other case the control unit is tested as a hardware implementation that can be connected externally.

As already indicated, the testing device has an input/output interface through which the testing device is connected to the technical system to be controlled or to the control unit to be tested, depending on the application. This input/output interface is connected in the testing device to the model present in the testing device, so that the model can communicate through the input/output interface with the technical system to be controlled or with the control unit to be tested. For this connection of the model to the input/output interface, the testing device has a plurality of input/output functions. These input/output functions represent the link between the model on one side and the concrete input/output interface on the other side.

One and the same testing device can be used for different simulations. In other words, one and the same testing device can be used with different models present in the testing device and with different control units to be tested, or technical systems to be controlled, connected to the testing device. It is evident that different channels of the input/output interface and different input/output functions are required for different connected devices/systems and for different models. Accordingly, it is customary to produce particular connections between the input/output interface on one side and the input/output connections on the other side prior to carrying out a particular simulation.

Nevertheless, there is as yet no satisfactory method that permits the connection of the input/output interface to the input/output functions with acceptable effort while providing satisfactory adaptation to the individual case.

SUMMARY OF THE INVENTION

It is therefore an object of the present invention to provide an improved method for connecting the input/output interface of a testing device equipped for testing a control unit to a model of a technical system present in the testing device through input/output functions present in the testing device.

Exemplary embodiments of the invention can include a method for connecting an input/output interface of a testing device equipped for testing a control unit to a model of a technical system present in the testing device, wherein the input/output interface is designed for connecting the control unit to be tested or for connecting a technical system to be controlled, and the model to be connected to the input/output interface is a model of the technical system to be controlled or a model of the control unit to be tested, wherein the testing device additionally has a plurality of input/output functions connected to the model. The method can have the following steps: (a) Provision of an interface hierarchy structure, which is a representation of at least a part of the input/output interface of the testing device, has a plurality of hierarchy levels, and is constructed from a first set of hierarchy elements, wherein the first set of hierarchy elements has a plurality of channels of the input/output interface that constitute the lowest hierarchy level of the interface hierarchy structure; (b) Provision of a function hierarchy structure, which is a representation of the plurality of input/output functions, has a plurality of hierarchy levels, and is constructed from a second set of hierarchy elements; (c) Allowing a selection of an arbitrary first hierarchy element from an arbitrary first hierarchy structure, wherein the first hierarchy structure is either the interface hierarchy structure or the function hierarchy structure, and by which means the other of the interface hierarchy structure and the function hierarchy structure is defined as the second hierarchy structure; (d) Isolation of a first sub-hierarchy structure based on the selection of the first hierarchy element, wherein the first sub-hierarchy structure comprises the first hierarchy element and the hierarchy elements located below the first hierarchy element; (e) Allowing a selection of a second hierarchy element from the second hierarchy structure, wherein the selection of the second hierarchy element is not limited to a hierarchy level of the second hierarchy structure that corresponds to the hierarchy level of the first hierarchy element; (f) Isolation of a second sub-hierarchy structure based on the selection of the second hierarchy element, wherein the second sub-hierarchy structure comprises the second hierarchy element and the hierarchy elements located below the second hierarchy element; (g) Determination of compatible connections between hierarchy elements of the first sub-hierarchy structure and hierarchy elements of the second sub-hierarchy structure, in particular determination of compatible connections between the hierarchy elements of the lowest hierarchy level of the first sub-hierarchy structure and the hierarchy elements of the lowest hierarchy level of the second sub-hierarchy structure; and/or (h) automatic configuration of at least a part of the compatible connections so that the model present in the testing device can communicate, through at least the part of the compatible connections, with the control unit to be tested or the technical system to be controlled.

The method according to an embodiment of the invention represents an optimized compromise between the automatic creation of compatible connections on the one hand, and the option of preselecting sub-hierarchy structures for limiting the automatic creation on the other hand. The method allows the selection of an arbitrary first hierarchy element either on the input/output interface side, which is to say in the interface hierarchy structure, or on the input/output function side, which is to say in the function hierarchy structure. In this way, a part of the hierarchy structure, i.e. a sub-hierarchy structure, is selected in a first of the two hierarchy structures, defining a first part of the selection set of hierarchy elements available for the connections that are to be created. The method additionally allows the selection of a second hierarchy element from the respective other hierarchy structure, which is to say from the function hierarchy structure or the interface hierarchy structure (depending on the choice of the first hierarchy element), thus defining a second sub-hierarchy structure. This, in turn, defines the second part of the selection set of hierarchy elements available for the connections that are to be created.

Very flexible selection of sub-hierarchy structures is possible because the hierarchy level of the first selected hierarchy element does not restrict or influence the selection of the second hierarchy element. In other words, neither a matching hierarchy level nor a matching number of hierarchy elements in the two sub-hierarchy structures is necessary, nor is there any other restriction with regard to the general structure of the sub-hierarchy structures for the selection of the second hierarchy element. In this way, a maximum degree of flexibility is made possible in the selection of the first hierarchy element and the second hierarchy element.

This maximum degree of flexibility allows the user who creates the connections in the testing device, regardless of whether it is a human user or a program, to make an assessment for each creation of compatible connections between the input/output interface and the input/output functions as to whether, for these particular connections, to prioritize the rapidity of the configuration process or the most accurate possible matching of the compatible connections to the present use case. For example, if the desire is for configuration of the compatible connections to take place especially rapidly, a large selection set of hierarchy elements can be specified by selecting hierarchy elements more from higher hierarchy levels, from which connections that tend to be more compatible can be automatically created in step (h). While this results in faster configuration, it is possible in this way to create compatible connections that are not perfectly matched to the present simulation case and that may not permit optimal simulation speed. In contrast, by selecting the first and second hierarchy elements more from lower hierarchy levels, it is possible to achieve better matching of the compatible connections to the present simulation case, and possibly increased simulation speed and/or improved measurement accuracy. As a result of this degree of freedom with regard to the selectable hierarchy level, which can be used differently on the side of the interface hierarchy structure and on the side of the function hierarchy structure, the user is able to place priority on exact desired compatible connections in some places on the basis of his knowledge of the simulation case at hand, while in other places accepting the possible disadvantages of the automatically created connections in exchange for the reduced configuration time. In this way, the user can undertake connection of the input/output interface and the input/output functions in an optimized manner with regard to the relative importance of configuration time and creation of specific compatible connections for a given simulation case.

This optimized compromise can be best illustrated with a look at other connection methods that either provide fully automatic connection of the complete hierarchy structures or individual connection of the hierarchy elements of the lowest hierarchy level. In the case of fully automatic connection of the interface hierarchy structure with the function hierarchy structure, the user initiates the connection process once, whereupon a plurality of compatible connections are created according to a previously defined algorithm. Since normally there are multiple different possibilities for creating compatible connections between the interface hierarchy structure and the function hierarchy structure, the result in this connection method depends substantially on the previously defined connection algorithm. The user has no influence on which specific connections are created, for example at the lowest hierarchy level.

In contrast, individual connection of the hierarchy elements of the lowest hierarchy level offers the user maximum flexibility and configuration freedom; he can determine each individual connection himself. This method for creating the connections is extremely time-consuming, however, because no automation of the creation of connections is provided at all. As compared to these two connection methods, the present invention allows an advantageous compromise between time duration of the configuration process and creation of the exact connections desired. Through the method according to the invention, the user can achieve the best compromise in the individual case with the aid of his specialized knowledge.

The optimized compromise has especially great impact in simulation scenarios in which multiple control units are connected to the testing device and are being tested simultaneously. Scenarios of this nature occur notably when multiple control units are to be tested simultaneously, whereby the correct interaction of the control units can also be tested. In such cases, an especially large number of connections must be configured.

The expression that the input/output interface is designed for connecting the control unit to be tested or for connecting a technical system to be controlled, and that the model to be connected to the input/output interface is a model of the technical system to be controlled or a model of the control unit to be tested, implies two different scenarios. First of all, the input/output interface can be designed for connecting the control unit to be tested, wherein the model to be connected to the input/output interface is then a model of the technical system to be controlled. Secondly, the input/output interface can be designed for connecting a technical system to be controlled, wherein the model to be connected to the input/output interface is then a model of the control unit to be tested.

The term "testing device" can describe a unit that is physically present, which is to say a concrete testing device, wherein the unit has a physical input/output interface, such as, e.g., a terminal block for connecting various cables. The term testing device should not imply here that this unit has exactly one element. On the contrary, the testing device can have multiple elements, such as, e.g., one or more connection module(s) and one or more computer(s) that make(s) its/their computing capacity available.

The input/output interface of the testing device can be organized hierarchically. For example, the input/output interface can be structured as follows: the testing device can have holders for accommodating connection structures, also referred to as racks. One or more input/output units, also referred to as I/O units, can be present in each of the racks. One or more circuit boards, also referred to as boards, or other connection modules can be present in each of the input/output units. Each of these boards or modules can have a plurality of channel groups, also referred to as channel sets. Each channel group, in turn, has a plurality of channels. The racks, I/O units, boards or modules, channel sets, and channels represent exemplary hierarchy levels, with each individual element of the interface hierarchy structure being a hierarchy element. The stated division is purely by way of example, which is to say that a multiplicity of different interface hierarchy structures are possible.

The totality of the parts of the physical connection structure can be referred to as the input/output interface. In abstract terms, one can visualize this input/output interface as a tree structure of different hierarchy elements on different hierarchy levels. In this sense, the interface hierarchy structure is a representation of at least a part of the input/output interface of the testing device. The lowest hierarchy level of the interface hierarchy structure is formed by the channels, which are each responsible for the transmission of a signal.

In this context, a physical connection, such as, e.g., a jack with a cable connected to it, can contain exactly one channel equally well as multiple channels, when the signals are transmitted over the single physical connection with any form of signal multiplexing. It is also possible for one channel to require a plurality of physical connections to be able to transmit a certain signal. The totality of the input/output interface can also be referred to as the hardware resources available in the testing device for the connection functionality. Consequently, the input/output interface is a hierarchically organized group of hardware resources.

The plurality of input/output functions is likewise structured hierarchically, and a representation of these input/output functions is provided in the method according to an embodiment of the invention as a function hierarchy structure. The input/output functions here can closely follow components of the model present in the testing device, which is to say components of the model of the system to be controlled or of the control unit to be tested. In particular, it is possible for the input/output functions to represent, in software, the connections that would be present in a hardware implementation of the technical system to be controlled or of the control unit to be tested, the model for which is present in the testing device. In the case that the model present in the testing device is a model of a technical system to be controlled, the function hierarchy structure can be constructed such that the input/output functionality of the system as a whole is divided into functions of the individual components of the system as a whole, which in turn can be divided into function blocks that in turn can have function sections, wherein the function sections represent electrical interfaces. There can in turn be one or more function elements at the lowest hierarchy level, which can be, e.g., signal groups or channel requests. This organization of the input/output functions is to be understood strictly by way of example, as well. A multiplicity of other function hierarchy structures are possible.

It is noted that the term function is not to be understood in the strict programming sense. An input/output function can also be an input/output program or subprogram or subroutine, which in turn can be hierarchically subdivided.

Exactly one model of a technical system may be present in the testing device. Multiple models of technical systems may also be present. The models may be separate from one another or connected to one another. It is possible for the interaction of different technical systems to be simulated using connected models. The external control unit to be tested or the external technical system to be controlled can communicate with one or more models in the testing device through the input/output interface and the input/output functions.

The combination of allowing the selection of an arbitrary first hierarchy element in step (c) and the isolation of the first sub-hierarchy structure based on the selection of the first hierarchy element in step (d) implies that the method according to the invention also has the receiving of the selection of the first hierarchy element. In this context, the method can have, prior to step (d), the additional step of receiving the selection of the first hierarchy element. In like manner, the method can have the step of receiving the selection of the second hierarchy element prior to step (f).

The expression that the selection of the second hierarchy element is not limited to a hierarchy level of the second hierarchy structure that corresponds to the hierarchy level of the first hierarchy element means that, in allowing the selection of the second hierarchy element from the second hierarchy structure, selection is allowed from both the hierarchy level of the second hierarchy structure that corresponds to the hierarchy level of the first hierarchy element in the first hierarchy structure and from hierarchy levels other than the hierarchy level that corresponds to the hierarchy level of the first hierarchy element in the first hierarchy structure. In this context, corresponding hierarchy levels are determined by counting the hierarchy levels either from the top to the bottom, or from the bottom to the top. In other words, in step (e) the selection of the second hierarchy element is allowed without any restrictions regarding specific hierarchy levels. It is possible that in step (e) the selection of a second hierarchy element from the second hierarchy structure is allowed when the second hierarchy element is on a hierarchy level that does not correspond to the hierarchy level of the first hierarchy element.

In the terminology of an exemplary embodiment, the lowest hierarchy level can represent the smallest hierarchy unit. In the representation of a hierarchical tree structure, the lowest hierarchy level can be composed of the leaves, sometimes also referred to as "leafs". On the interface side, the channels of the input/output interface constitute the lowest hierarchy level. On the function side, the lowest hierarchy level can be composed of elements corresponding to the channels, such as channel requests, for example. Nevertheless, other elements are also possible on the lowest hierarchy level here.

The steps of isolation of a first sub-hierarchy structure and isolation of a second sub-hierarchy structure can also lead to the isolation of the entire interface hierarchy structure or function hierarchy structure, or even to the isolation of a single hierarchy element of the lowest hierarchy level, depending on the choice of the first and second hierarchy elements. For example, if the selected first hierarchy element is the highest hierarchy element of the interface or function hierarchy structure, then the entire interface or function hierarchy structure is isolated. If, for example, the first hierarchy element is a hierarchy element of the lowest hierarchy level of the interface or function hierarchy structure, then the first sub-hierarchy structure has this one hierarchy element. If, for example, the first hierarchy element is a hierarchy element of a middle hierarchy level, which is the most frequent case in most application scenarios, then the first sub-hierarchy structure includes a part of the first hierarchy structure. Similar applies with the second hierarchy element and the second sub-hierarchy structure. Steps (d) and (f) can accordingly also be expressed as isolation of a first/second sub-hierarchy structure based on the selection of the first/second hierarchy element, wherein the first/second sub-hierarchy structure comprises the first/second hierarchy element and, if present, the hierarchy elements located below the first/second hierarchy element.

The determination of compatible connections between hierarchy elements of the first sub-hierarchy structure and hierarchy elements of the second sub-hierarchy structure means that a check is made as to whether a specific hierarchy element of the first sub-hierarchy structure, if applicable with the participation of the hierarchy elements located below it, can communicate with a hierarchy element of the second sub-hierarchy structure, if applicable with the participation of the hierarchy elements located below it. In other words, a check is made as to whether an input/output function, defined by a hierarchy element on a specific hierarchy level, can control a part of the input/output interface, likewise defined by a specific hierarchy element, which is to say can apply signals to the part of the input/output interface or can receive signals from the specific part of the input/output interface.

Each hierarchy element can have one or more properties. In other words, each hierarchy element can have certain characteristics. On the side of the input/output interface, the hierarchy elements can have descriptive properties that describe the hardware. On the side of the input/output functions, the hierarchy elements can have prescriptive properties that describe the requirements that should be fulfilled on the side of the input/output interface so that an assignment to a hierarchy element of the input/output interface is possible. To check the compatibility of hierarchy elements, the characteristics of the hierarchy elements of the input/output functions can be compared with the characteristics of the hierarchy elements of the input/output interface and checked for compatibility. In a simple example, a check is made as to whether an input/output function on the selected hierarchy level is capable of evaluating a DC signal or an AC signal, and a check is made as to whether the selected hierarchy element of the input/output interface is an AC connection or a DC connection. Another simple example concerns the communication direction. A measurement channel can be connected to a measurement function. Furthermore, it is possible for there to be channels that measure both a current and a voltage, while other channels can evaluate one of the two quantities. The checking can include both the comparison of such elementary characteristics as well as other comparisons, such as, e.g., the speed of the connection and readout frequency of the input/output function or the like. It is possible that a channel can measure the state of a signal, for example a voltage value, or that a channel can process the signal to be measured, for example can measure a time between two signal edges. The above-mentioned properties of the channels and other hierarchy elements are strictly by way of example. The hierarchy elements can have a multiplicity of different types of properties or characteristics.

The determination of the compatible connections can, but does not necessarily have to, comprise a complete comparison of all hierarchy elements of the first sub-hierarchy structure with all hierarchy elements of the second sub-hierarchy structure. It is also possible that only hierarchy elements of the same hierarchy levels are checked for compatibility. In a special case it is possible that the compatibility of the hierarchy elements of the lowest hierarchy level of the first sub-hierarchy structure and of the hierarchy elements of the lowest hierarchy level of the second sub-hierarchy structure is determined. At this lowest level, the characteristics of the hierarchy elements can be compared for compatibility especially simply, since it is neither possible nor necessary to take into account hierarchy elements located below them in any form.

The automatic configuration of at least a part of the compatible connections that have been determined ultimately allows communication between the model present in the testing device and the control unit to be tested or the technical system to be controlled that is connected to the testing device. The concept of configuration here can comprise merely the creation of a software-based connection between the representation of the input/output interface and the matching input/output function. But it is also possible that the step of configuration defines additional characteristics of this connection. In any case, the step of configuring the compatible connection ensures that an association exists between the hierarchy elements of such a nature that the model of the testing device can access the input/output interface through the compatible connections during the simulation to be carried out after the configuration. In other words, the communication functionality through the input/output interface is configured. Expressed in yet another way, the testing device is configured with regard to the communications capacity between the model and the input/output interface.

The possibility exists that a plurality of compatible connections are possible between the first and the second sub-hierarchy structures, some of which are mutually exclusive, for example because they contain the same hierarchy elements. In such a case, in step (h) the method can select the compatible connections that are automatically configured either randomly or according to other decision criteria, such as by a ranking of the channels. In other words, step (h) can have the step of selecting one compatible connection from mutually exclusive compatible connections.

The step of automatic configuration can relate to compatible connections of any hierarchy level. In other words, the compatible connections created in step (h) can be on any hierarchy level. In particular, at least a part of the compatible connections between the hierarchy elements of the lowest hierarchy level of the first sub-hierarchy structure and the hierarchy elements of the lowest hierarchy level of the second sub-hierarchy structure can be configured automatically in step (h).

Emphasis is placed on the fact that the identification of the method steps with the letters (a) to (h) does not imply a sequence. On the contrary, the steps of the method can be carried out in any desired order as long as steps that draw on the results of other steps are carried out after those steps. However, the order of the steps using the sequence of the letters (a) to (h) does represent a possible and also useful order for the steps.

According to an embodiment, in step (c) a user is allowed to select an arbitrary first hierarchy element from the first hierarchy structure, and/or in step (e) the user is allowed to select the second hierarchy element from the second hierarchy structure. It is also possible that in step (c) and/or in step (e) the selection is made possible by a machine-assisted method, such as through a configuration program or configuration script, for example.

According to an embodiment, step (h) is characterized in that all compatible connections are automatically configured. In other words, after the determination of the possible compatible connections, a maximum possible number of compatible connections is configured. This has the advantage for the user of ensuring that the maximum possible number of compatible connections between the sub-hierarchy structures is configured through the selection of the first hierarchy element in the first hierarchy structure and of the second hierarchy element in the second hierarchy structure. The user need not concern himself with the lowest hierarchy level with regard to the first and second sub-hierarchy structures if he does not consider it necessary for these connections. Yet he can nonetheless rely on the fact that the later simulation can access the connections needed for a specific subsidiary aspect of the simulation.

According to an embodiment, step (h) has: Automatic configuration of connections at a higher level, by which means hierarchy elements of the first sub-hierarchy structure that are located above the lowest hierarchy level and compatible hierarchy elements of the second sub-hierarchy structure that are located above the lowest hierarchy level are connected. In this way, a communications connection is created between the model and the input/output interface at a level located hierarchically above the lowest hierarchy level. In this way, the communication of individual function blocks that extend beyond the lowest level is configured jointly.

According to an embodiment, hierarchy elements that are located outside of the first sub-hierarchy structure above the first hierarchy element, and/or hierarchy elements that are located outside of the second sub-hierarchy structure above the second hierarchy element, are additionally taken into account for the automatic configuration of connections at a higher level. In this way, the configuration of compatible connections extends upward beyond the first sub-hierarchy structure and the second sub-hierarchy structure, by which means a more comprehensive configuration across multiple hierarchy levels can take place without significant added effort.

According to an embodiment, at least a portion of the hierarchy elements of the interface hierarchy structure and at least a portion of the hierarchy elements of the function hierarchy structure, in particular at least a portion of the channels and at least a portion of the hierarchy elements of the lowest hierarchy level of the function hierarchy structure, are characterized by attributes, and the determination of compatible connections in step (g) takes place as a function of the compatibility of the attributes. Attributes are a convenient way for defining the characteristics of the hierarchy elements. Moreover, attributes are easily compared by machine, making it possible to check the compatibility of the individual hierarchy elements rapidly.

According to an embodiment, the compatible connections include a plurality of connections of like kind, wherein connections of like kind exist between channels and hierarchy elements of the lowest hierarchy level of the function hierarchy structure with the same attributes in each case, wherein the combination of the connections of like kind forms a compatible group connection. In other words, connections of like kind are present when multiple hierarchy elements with identical attributes in the interface hierarchy structure are connected with multiple hierarchy elements with identical attributes in the function hierarchy structure. The totality of these connections of like kind represents a compatible group connection. The following is one example of an application case for a compatible group connection of this nature: a current signal having up to 10 A current should be present between the control unit and the testing device. However, the input/output interface has connections that support up to 4 A current. In this case, three connections of like kind can be created between such connections and corresponding hierarchy elements of the function hierarchy structure, which in their attributes make possible a connection control of 4 A. The combination of these three connections of like kind then provides for a compatible group connection, so that the desired signal exchange becomes possible.

According to an embodiment, in the event that it is established in step (g) that there are more channels than hierarchy elements of the lowest hierarchy level on the side of the function hierarchy structure within the first and second sub-hierarchy structures, then in step (h) the following step is additionally executed: (h') generation of additional hierarchy elements of the lowest hierarchy level on the side of the function hierarchy structure, and automatic configuration of additional compatible connections using the additional hierarchy elements that are generated. Since the input/output functions are present in software, and accordingly are not static, but instead can be dynamically changed, the number of compatible connections can be increased by step (h'), by which means as large a number as possible of the hierarchy elements in the sub-hierarchy structure on the side of the interface hierarchy structure is used and hence is available for the communication of the model. It may be the case, for example, that two connections with signals of up to 5 A current are present on the side of the interface sub-hierarchy structure, while just one hierarchy element that supports communication with a connection of this nature is present in the function sub-hierarchy structure. In such a case, the method can generate additional such hierarchy elements in the function sub-hierarchy structure in order to provide compatible hierarchy elements for the connections existing in the interface sub-hierarchy structure.

According to an embodiment, step (e) allows the selection of an arbitrary second hierarchy element from the second hierarchy structure. In this case, the method thus allows not only the selection of an arbitrary first hierarchy element in the first hierarchy structure, but also the selection of an arbitrary second hierarchy element in the second hierarchy structure. In this way, it is made possible for the user to have the method test hierarchy elements for possible connections and configurations with complete freedom. In this case it is possible, however, that no connections are automatically configured in step (h), because in step (g) it was established that there are no compatible connections in the two sub-hierarchy structures defined by the selection.

According to an embodiment, the method has the following step (k), which is executed prior to step (e). For each of the hierarchy elements of at least a part of the second hierarchy structure, step (k) comprises an isolation of an applicable sub-hierarchy structure that comprises the applicable hierarchy element and hierarchy elements located below the applicable hierarchy element, and a check of whether at least one hierarchy element is present in the applicable sub-hierarchy structure for which a compatible connection to a hierarchy element of the first sub-hierarchy structure is possible. It is in turn possible that in step (k) the presence of possible compatible connections on the lowest hierarchy level and/or on higher hierarchy levels is checked. Due to the execution of step (k), in step (e) a selection is allowed of those hierarchy elements for whose sub-hierarchy structure a compatible connection was established in step (k). In this way, a preliminary selection is made by the method for the user as to which hierarchy elements on the side of the second hierarchy structure can result in compatible connections in the first place. This in turn allows a more efficient connection process between the input/output interface and the input/output functions. The fact that only certain hierarchy elements are available for selection can be indicated to the user visually, e.g., by means of colored markings, changes in the cursor, or the like, when he wishes to select the second hierarchy element on the screen.

According to an embodiment, at least the steps (c) to (h) are executed in multiple passes, wherein compatible connections from an earlier pass are no longer available for a later pass. It is possible in general that a hierarchy element can no longer be part of additional connections once this hierarchy element has been used up for a previously created connection. This may apply to all hierarchy elements, but may also apply to only a part of the hierarchy elements. It is possible, for example, that the hierarchy elements of the lowest hierarchy level are available for one compatible connection apiece, while the hierarchy elements of higher levels can be part of one or more compatible connections. In this way, the user is allowed to configure the entire connection between the input/output interface and the input/output functions in iterative steps, while preserving a clear association between hierarchy elements from the two hierarchy structures. In this way, it is ensured during the iterative configuration of the compatible connections that the resultant connections permit communication between the model and the input/output interface with consistent data.

According to an embodiment, at least the steps (c) to (h) are executed in multiple passes, wherein step (h) has the following steps at least once, depending on the selection of the first hierarchy element and of the second hierarchy element: Deletion of at least one old, compatible connection configured in an earlier pass, and configuration of at least one new, compatible connection, wherein at least one hierarchy element of the old, compatible connection is used for a new, compatible connection. In this way, as well, it is ensured that there are unique connections between hierarchy elements of the first hierarchy structure and hierarchy elements of the second hierarchy structure. However, this feature allows the user to freely select hierarchy elements from the interface hierarchy structure and the function hierarchy structure during iterative configuration of the connections, wherein the method gives priority to such a new selection over an old selection and replaces old connections with new ones if they are wanted as a result of the new selection. Once again, it is possible that the hierarchy elements may be part of one compatible connection or that certain hierarchy elements may also be part of multiple compatible connections.

It is also possible that the method determines on the basis of a decision criterion whether, in the case of iterative performance of the method and in the case of an appropriate new selection that is in conflict with an existing, old, compatible connection, the old, compatible connections remain as described above, or are deleted and the hierarchy elements are released for new, compatible connections.

According to an embodiment, the testing device can be a hardware-in-the-loop simulator. It is also possible that the testing device can be, for example, a rapid control prototyping testing device.

According to an embodiment, the model present in the testing device can be a software model of the technical system to be controlled or of the control unit to be tested. Accordingly, the input/output functions can be software-based functions.

According to an embodiment, steps (c) and (e) include the presentation of the first hierarchy structure and of the second hierarchy structure on a graphical user interface of a computing device, such as a computer, a tablet, or a mobile telephone. In this way, it is made possible for the user to graphically select the first hierarchy element and the second hierarchy element. A so-called drag-and-drop method can also be used to allow the user to select the first and second hierarchy elements, in which it is made possible for the user to graphically drag the arbitrary selected first hierarchy element from the first hierarchy structure onto a second hierarchy element in the second hierarchy structure.

Exemplary embodiments of the invention also comprise a method for testing a control unit with a testing device equipped for testing a control unit, wherein the method has the following steps: performance of the method for connecting the input/output interface of the testing device according to one of the embodiments described above, and performance of a simulation in which the model present in the testing device communicates with the control unit to be tested or the technical system to be controlled through the compatible connections that were automatically configured in step (h) of the method.

Exemplary embodiments of the invention also comprise a computer program product and computer program for carrying out a method for connecting the input/output interface of the testing device designed such that a method according to one of the embodiments described above can be carried out.

Exemplary embodiments of the invention also comprise a testing device that is equipped for testing a control unit, has an input/output interface for connecting the control unit to be tested or for connecting a technical system to be controlled, and has a model of the technical system to be controlled or of the control unit to be tested as well as a plurality of input/output functions connected to the model, wherein the testing device is equipped to carry out a method according to one of the above-described embodiments.

Exemplary embodiments of the invention also comprise a combination of a testing device and an external computing device connected therewith, such as, e.g., a computer, tablet, or mobile telephone, wherein the testing device is equipped for testing a control unit, has an input/output interface for connecting the control unit to be tested or for connecting a technical system to be controlled, and has a model of the technical system to be controlled or of the control unit to be tested as well as a plurality of input/output functions connected to the model, and wherein the external computing device is equipped to carry out a method according to one of the above-described embodiments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 2a to 2d show exemplary hierarchy structures for exemplary input/output interfaces and for exemplary input/output functions.

DETAILED DESCRIPTION

Figure 1:
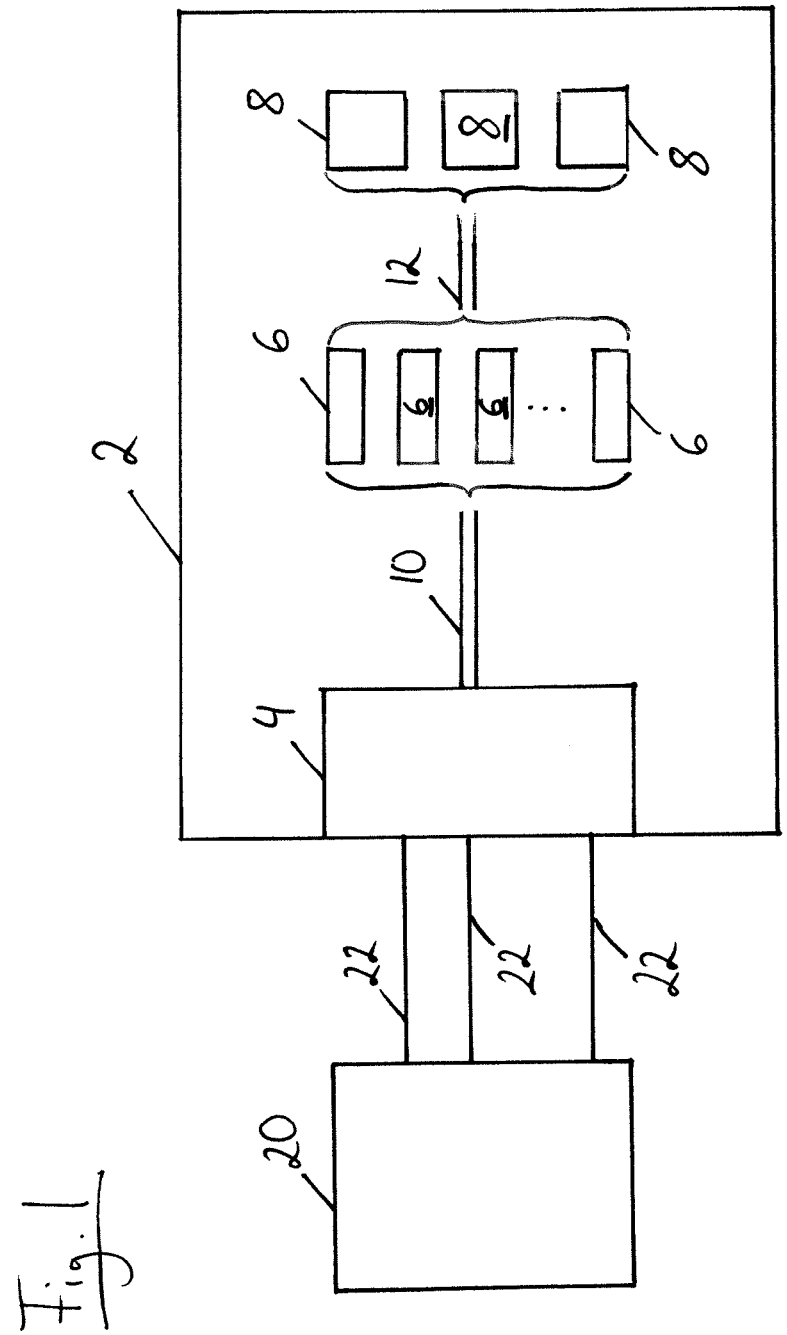
FIG. 1 shows a block diagram of an exemplary testing device that is connected to an exemplary control unit to be tested.

In FIG. 1, an exemplary testing device 2 according to an embodiment of the invention is shown in a block diagram. An embodiment of the method according to the invention for connecting an input/output interface 4 of the testing device 2 to a model 8 of a technical system present in the testing device 2 can be carried out on the testing device 2.

In the exemplary embodiment from FIG. 1, the testing device 2 has an input/output interface 4, a plurality of input/output functions 6, and three models 8 of technical systems. The input/output interface 4 and the input/output functions 6 of the testing device 2 are linked by compatible connections 10. The creation of these compatible connections 10 is the subject matter of the method according to the invention, as is explained in detail below. The input/output functions 6 and the models 8 are linked by connections 12. The exemplary testing device 2 has a plurality of input/output functions 6, four of which are shown in FIG. 1 for the purposes of illustration. Furthermore, the testing device 2 can have any desired number of models 8 of technical systems. For example, just one model 8 may be present. It is also possible that multiple models are present, wherein the number of models can be smaller or greater than the three models 8 that are shown. The models 8 may be connected to one another so that they can communicate with one another.

In the exemplary embodiment from FIG. 1, one model 8 is a model of a technical system to be controlled. For example, a model 8 can be a model of an engine of a motor vehicle to be controlled by a control unit. In general, each model 8 can be a model of any desired technical system that in operation is controlled by a control unit and whose control unit is to be tested with the testing device 2. It is also possible that one or more models 8 are models of technical systems that are not controlled but that interact with the technical system to be controlled, and whose responses to the control are to be observed. A model 8 can also be a model of a technical system that is not directly controlled by the control unit, but that supplies data, such as sensor data, to the control unit and is therefore part of the control. In other words, the concept of communication between the model and the external control unit does not necessarily imply that a bidirectional signal flow takes place with a particular model. The signal flows can also be distributed among different models.

In the test setup from FIG. 1, the testing device 2 is connected to a control unit 20. The control unit 20 can be, e.g., a prototype of the control unit with which the technical system to be controlled is to be controlled in operation after development is finished. If the model 8 is a model of an engine, then the control unit 20 is an engine control unit to be tested. The control unit 20 is connected to the testing device 2 by multiple cables 22. The cables 22 can have the same design as the cables that will be used in later operation to connect the control unit to the technical system to be controlled. However, they may also be cables designed specifically for the test. The cables 22 allow the exchange of signals between the testing device 2 and the control unit 20. It is also possible for multiple control units to be present that are connected to the testing device 2 at the same time. Multiple control units can be tested in parallel without influencing one another. It is also possible, however, that the influence of the control units on one another is exactly what is meant to be tested through the model of the technical system to be controlled.

The control unit 20 can be implemented in hardware, which is to say the control unit 20 is a physical device that is connected to the physical testing device 2 by cables 22. Due to this design, the control unit can be tested as a hardware unit. This is the reason why the testing device 2 can be referred to as a hardware-in-the-loop simulator (HIL simulator). The control unit 20 can be subjected to a real-time simulation using the testing device 2. The fact that the control unit 20 is implemented in hardware does not say anything about the internal composition of the control unit 20. The control or regulation algorithm realized in the control unit 20 can also be implemented by a piece of software that runs on a processor.

The model 8 or the models 8 and the input/output functions 6 are a software model or software models and the software input/output functions associated therewith. The connections 12 are software connections as well. In contrast, the input/output interface 4 includes hardware resources that allow the cable 22 to be connected. The input/output functions 6 represent the input and output of the signals in the model 8 or models 8 exchanged through the cables 22. In other words, the model 8 or the models 8 communicates/communicate with the control unit 20 through the input/output functions 6, through the compatible connections 10, through the input/output interface 4, and through the cables 22.

The functionality of the control unit 20 can be tested or verified on the basis of this communication with a model 8 or with multiple models 8. To this end, various simulations normally are carried out on the testing device 2 and the responses of the control unit are observed and evaluated. An evaluation is made as to whether the control unit is behaving as desired and is controlling the model 8 of the technical system to be controlled as desired.

It is also possible that a model 8 is a model of a control unit and that a technical system to be controlled is connected to the testing device 2 by the cables 22. In this way a software implementation of a control unit can be tested, which is especially useful at an early point in the control unit development process. In this case, the testing device 2 can be, for example, a rapid control prototyping (RCP) testing device. With RCP, the technical system to be controlled can be any technical system to be controlled, even an existing control unit that can be connected in turn to a technical system to be controlled and on which new or additional control functionality can be tested with the aid of the testing device 2.

Regardless of whether the testing device 2 is an HIL simulator or an RCP testing device, the compatible connections 10 are created during configuration of the testing device 2 for a specific test. Different connections between the input/output interface 4 and the input/output functions 6 are required in the individual case depending on the model 8 present or models 8 present, the external control unit 20 (or external technical system to be controlled), and the desired simulation sequence.

In the block diagram from FIG. 1, the input/output interface 4 and the input/output functions 6 are represented as blocks. The input/output interface 4 and the input/output functions 6 each have a hierarchical structure, however. This hierarchical structure can have many different embodiments, and can be represented in many different ways.

FIG. 2 shows an exemplary hierarchy structure of the input/output interface 4, represented as a hierarchical block structure. The hierarchy structure of the input/output interface 4 is also called an interface hierarchy structure. The uppermost hierarchy level of the interface hierarchy structure is the entire input/output interface 4, also referred to as HW-system. In the exemplary embodiment from FIG. 2, the input/output interface 4 has one carrier 400 for connection structures, a so-called rack 400. The rack 400 constitutes an installation unit, in which connections are housed. The rack 400 has an input/output unit 410, also referred to as an I/O unit. It is also possible for multiple such input/output units to be present, which are installation subunits. The input/output unit has two circuit boards 420 and 422, each of which accommodates multiple physical connections. The circuit boards 420 and 422 are lower-level installation units that can be mounted in the input/output unit 410, and are also referred to as I/O boards. Instead of the I/O boards, or in addition to the I/O boards, input/output modules, also referred to as I/O modules, can also be present; these likewise represent installation units. In the present case, the I/O board 420 has two channel groups 430 and 432, and the I/O board 422 has one channel group 434. The channel groups are also referred to as channel sets. Each channel group can in turn have one or more channels. In the present case, each channel group has a plurality of identical channels. Channel group 430 has two channels 430.$a$ and 430.$b$, channel group 432 likewise has two channels 432.$a$ and 432.$b$, and channel group 434 similarly has two channels 434.$a$ and 434.$b$. The rack 410, the input/output unit 410, the I/O boards 420 and 422, the channel groups 430, 432, and 434, and also the channels 430.$a$, 430.$b$, 432.$a$, 432.$b$, 434.$a$ and 434.$b$ are hierarchy elements of the interface hierarchy structure.

Each of the channels from FIG. 2 may be associated with connector pins of the physical connections of the input/output interface. For example, the channel 430.$a$ is associated with a signal pin and a reference pin. This means that the signal flow provided by channel 430.$a$ takes place through these two connector pins. Depending on the type of the channel, various connector pins can be provided for physical signal transmission. For channel 434.$a$, for example, a load signal pin (Load Signal) and a load reference pin (Load Reference) are also shown, for example. In this context, different channels need not access different connector pins. Multiple channels can share the same connector pins. In other words, multiple signal channels can be placed on one physical transmission path. Expressed yet another way, it is possible that channels each require a plurality of connector pins, while it is also possible that connector pins are jointly used by a plurality of channels. Depending on the type of connection and the type of signals transmitted, the connector pins can have various shapes and properties and/or meet different standards. With regard to the physical implementation of the individual connections of the input/output interface, there are a multiplicity of possible implementations.

The connections of the input/output interface can be of various types. For example, there can be analog connections and digital connections. The connections can be unidirectional or bidirectional. The connections can support different voltage and current levels. Furthermore, the connections can be, for example, switch connections or ground connections or connections to load resistances. The input/output interface 4 can in general have all types of connections to which a control unit 20 or a device to be controlled, such as, e.g., an actuator, or measuring device, such as, e.g., a sensor, or another appropriate device, can potentially be connected in later operation.

The above-mentioned properties of the connections are attributes of the connections which characterize the connections. In like manner, the rack 400, the input/output unit 410, the I/O boards 420 and 422, the channel groups 430, 432, and 434, and the individual channels have attributes that characterize them. Each hierarchy element is characterized by attributes.

Figure 2A:
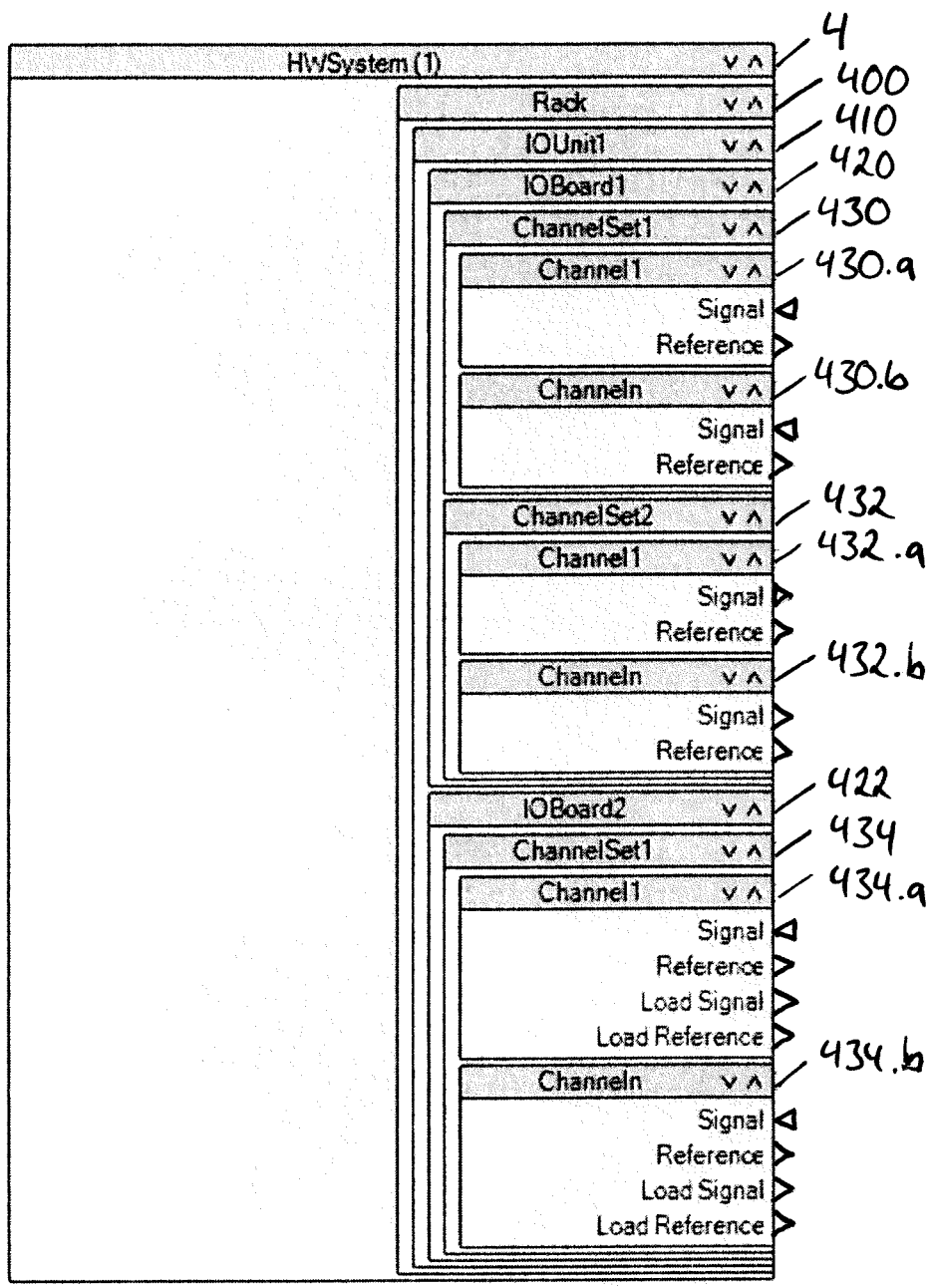
Figure 26:
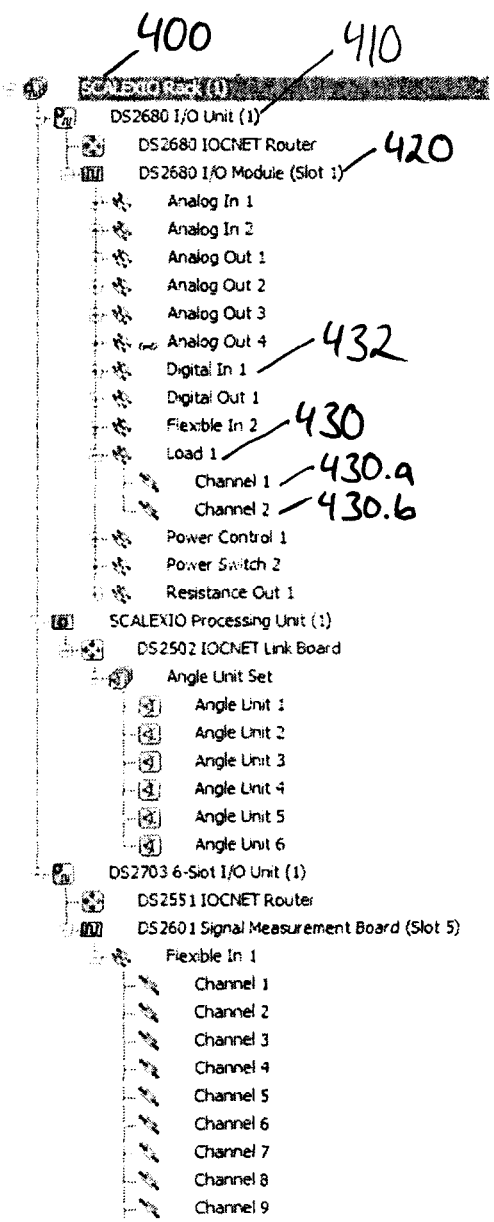

FIG. 2$b$ shows an exemplary sub-hierarchy structure of another exemplary input/output interface. Hierarchy elements similar to those in FIG. 2a are labeled with the same reference numbers for reasons of better clarity. In FIG. 2b, the hierarchy elements are represented in a tree structure. The highest hierarchy level shown is the rack 400. In FIG. 2b it is labeled "SCALEXIO Rack", where the name Scalexio® refers to an HIL simulator from dSPACE GmbH of Paderborn, Germany. In this respect, a tree structure such as the one shown in FIG. 2b is also the result of the documentation of, and of using, the Scalexio® HIL simulator. FIG. 2b shows the hierarchy elements of different hierarchy levels in a clear way. For easy comparison with FIG. 2a, the "DS2680 I/O Unit" is labeled with reference number 410, the "DS2680 I/O Module" with reference number 420, the channel group "Digital In 1" with reference number 432, the channel group "Load 1" with reference number 430, and the channels contained therein, "Channel 1" and "Channel 2", are labeled with reference numbers 430.a and 430.b. The labels for the hierarchy elements in FIG. 2b are largely at least based on the English language, because the operating language of the Scalexio® HIL simulator is English and because the German technical terminology uses most of the terms in English as well. The language of the designations has no relevance to the operation of the invention. It is evident that the channel groups can have a wide range of different properties, for example can be associated with analog or digital or load or switch connections.

The input/output functions 6 are likewise hierarchically organized. They have a function hierarchy structure. The function hierarchy structure can be oriented toward a model 8 of the technical system to be controlled, but this is not necessarily the case. If the model 8 that is used is the model of an engine to be controlled, the function hierarchy structure can be structured as follows: the highest hierarchy level refers to the totality of all functions that communicate with the totality of all input/output connections of the engine model. The hierarchy elements of the second highest hierarchy level are functions that each communicate with the modeled input/output connections of the individual engine modules; the hierarchy elements of the third highest hierarchy level are the function sections that handle the communication with the modeled actual input/output connections of the engine, which is to say that handle the communication with the modeled sensors and actuators of the engine; the hierarchy elements of the hierarchy level below that in turn represent the channels on the modeled input/output connections of the engine.

In other words, the function hierarchy structure can also be described as follows: there are functions which in turn have function blocks, which in turn have electrical interfaces as function elements, which themselves have signal groups as function elements, which in turn have channel requests. Emphasis is placed on the fact that there can be many different hierarchy structures on the function side, as well. The aforementioned hierarchy levels are merely by way of example. The function hierarchy structure can also have more or fewer hierarchy levels and/or different hierarchy levels.

Figure 2C:
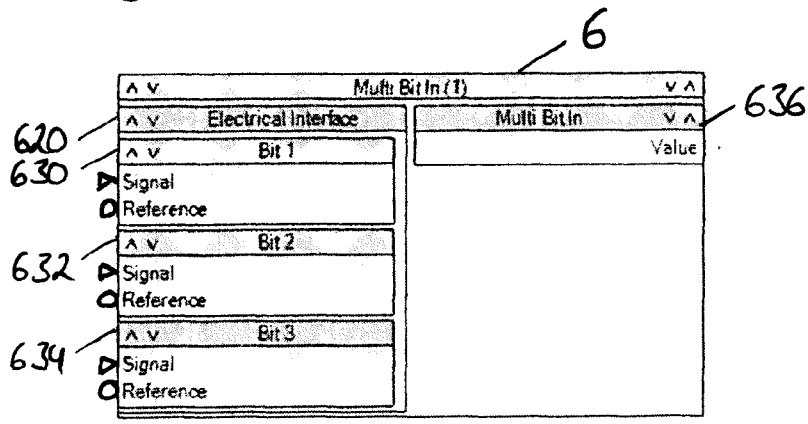

FIG. 2c shows an exemplary hierarchy structure of an input/output function 6, represented in a hierarchical block structure. The input/output function 6 bears the name "Multi Bit In", and thus refers to a digital input function. The input/output function 6 has an electrical interface 620 as a lower-level hierarchy element. The electrical interface 620 has three so-called signal groups 630, 632, and 634, labeled "Bit 1", "Bit 2", and "Bit 3". The signal groups may constitute the lowest hierarchy level. It is also possible, however, that there are also channel requests located below the signal groups as hierarchy elements that are not shown in FIG. 2c, but which are discussed with reference to FIG. 2d. The properties labeled "Signal" and "Reference" relate to access to connector pins that channels on the side of the input/output interface should have for a compatible connection to exist. The input/output function 6 also has a signal group 636 labeled "Multi Bit In".

Figure 2D:
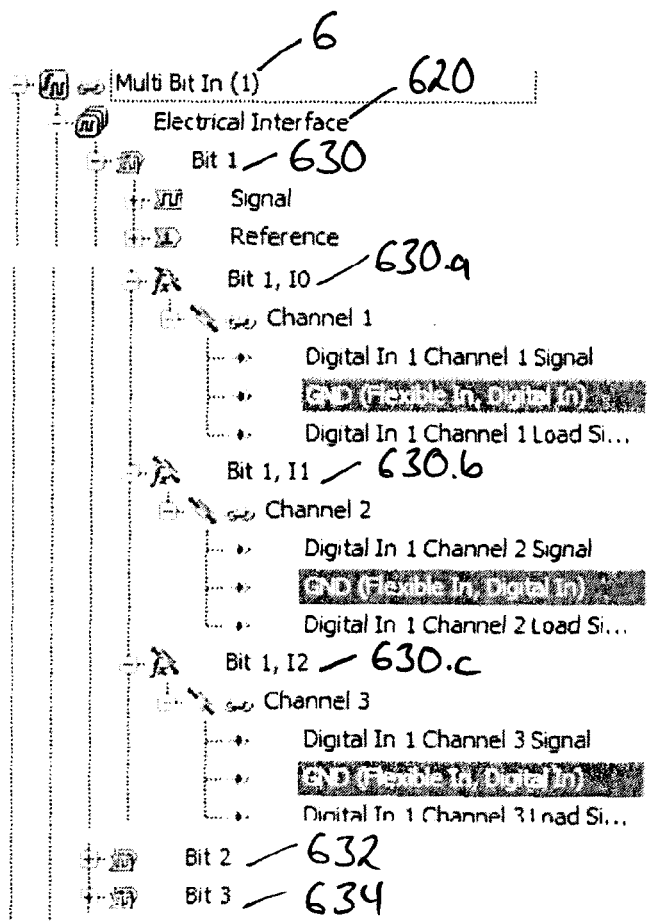

FIG. 2d shows the exemplary sub-hierarchy structure from FIG. 2c in a different type of representation, namely as a tree structure. Of course, the tree structure in FIG. 2d additionally shows the channel requests 630.a, 630.b, and 630.c, all of which are located below the signal group 630 in terms of hierarchy. Moreover, for the three channel requests 630.a, 630.b, and 630.c, the tree structure in FIG. 2d shows the channels connected therewith, labeled "Channel 1", "Channel 2", and "Channel 3". In this regard, the tree structure in FIG. 2d not only illustrates a part of the function hierarchy structure, but also three created compatible connections. The process of creating the compatible connections is described below with reference to FIG. 3-6. FIG. 2d illustrates an exemplary result of such exemplary methods for connecting the input/output interface. In the example from FIG. 2d, the channel requests 630.a, 630.b, and 630.c are connected to channels of the channel group 432 from FIG. 2b. This is evident from the description of the compatible connections in FIG. 2d. For example, for the channel request 630.a, labeled "Bit 1, IO", the connection is characterized among other things by "Digital In 1 Channel 1 . . . ", with the channel group 432 in FIG. 2b being labeled "Digital In 1".

Both the input/output interface and the input/output functions may be hierarchically organized. This hierarchical organization can be represented graphically in a variety of ways, for instance through a structured block diagram, as in FIG. 2a or FIG. 2c, or through a tree structure, as in FIG. 2b or FIG. 2d. For reasons of better clarity, exemplary implementations of the method in the following figures are explained with reference to two tree structures, with the two tree structures representing the first and second hierarchy structures.

FIG. 3 shows a first example of the interface hierarchy structure and of a part of the function hierarchy structure during the course of an exemplary method according to the invention. Referring to FIG. 3, an example is illustrated of how an interface hierarchy structure and a function hierarchy structure can be provided. The left-hand tree structure is a representation of a hierarchical input/output interface 4. The root node of the interface hierarchy structure, also labeled with reference number 4, constitutes the highest hierarchy level. Located one hierarchy level below the highest hierarchy level are two nodes 430 and 432, both of which are associated with the root node 4. In the terminology of hierarchy structures one can also say that the root node contains the two nodes 430 and 432. In addition, the interface hierarchy structure contains four hierarchy elements of the lowest hierarchy level, namely the hierarchy elements 430.a, 430.b, 432.a, and 432.b. As hierarchy elements of the lowest hierarchy level, the hierarchy elements 430.a, 430.b, 432.a, and 432.b are also referred to as leaves of the tree structure, or sometimes so-called leafs. The leaves 430.a and 430.b are associated with the node 430, while the leaves 432.a and 432.b are associated with the node 432. The root node 4, the nodes 430 and 432, and the leaves 430.a, 430.b, 432.a, and 432.b are all hierarchy elements, and together constitute a representation of the input/output interface of the testing device.

Figure 3A:
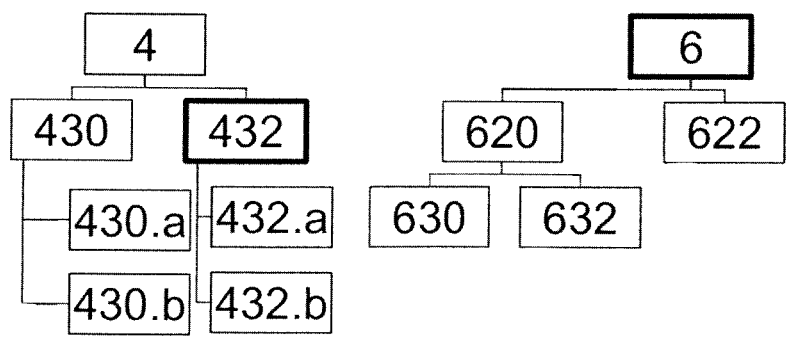
FIGS. 3a and 3b show an exemplary implementation of the method for connecting the input/output interface on the basis of the applicable interface hierarchy and function hierarchy structures.
Figure 3B:
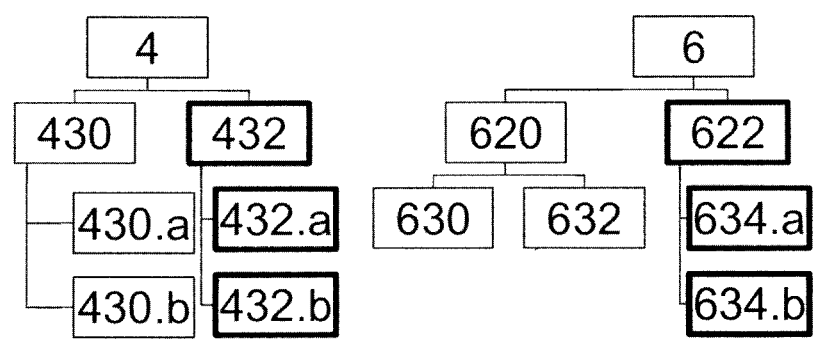

Only a portion of the function hierarchy structure is represented in FIG. 3. In particular, a single input/output function 6 is shown in hierarchical representation in FIG. 3a. The part of the function hierarchy structure also includes a root node. Like the input/output function 6 in FIG. 1, this root node is also labeled with the reference number 6. Located one hierarchy level below the root node 6 are two nodes 620 and 622, both of which depend on the root node 6. The node 620, in turn, contains two subnodes 630 and 632. The root node 6, the two nodes 620 and 622, and the two subnodes 630 and 632 are all hierarchy elements, which together constitute the function hierarchy structure. At the point in time shown, the function hierarchy structure does not (yet) contain any hierarchy elements of the lowest hierarchy level, which is to say has no leaves yet. This is possible because the input/output functions are a software construct, in which additional hierarchy elements can be generated at any time.

The two hierarchy structures from FIG. 3a are shown as approximately equal in size, which is to say with a similar number of hierarchy elements. This is merely by way of example for better understanding. In many cases, the fact of the matter is that the interface hierarchy structure, which represents a very complex input/output interface 4, is itself a very branched structure. In contrast, a single input/output function 6 is considerably less complex in many cases. It is the totality of all input/output functions that results in a much-branched function hierarchy structure.

The exemplary method according to the invention allows, after the provision of the interface hierarchy structure and the function hierarchy structure, the selection of an arbitrary first hierarchy element from the two hierarchy structures. For the exemplary method sequence, it is assumed that the choice, whether the selection is made by a human user or in an automated way by a configuration program, falls on the node 432. In other words, in the exemplary sequence, the method includes receiving the selection of the node 432. This selection of the node 432 is illustrated in FIG. 3a by the heavy outline. In this way, the node 432 is defined as the first hierarchy element. It may additionally defined by this selection that the interface hierarchy structure is the first hierarchy structure, which in turn implicitly defines that the function hierarchy structure is the second hierarchy structure. In like manner, due to the selection of the node 432, a first sub-hierarchy structure is defined that contains the node 432 and the leaves 432.a and 432.b, which is to say the first hierarchy element and all hierarchy elements in the first hierarchy structure located below the first hierarchy element.

The user or the configuration program is free to select the first hierarchy element from the function hierarchy structure. In this case the function hierarchy structure is then the first hierarchy structure, the interface hierarchy structure is the second hierarchy structure, and the first sub-hierarchy structure is a part of the function hierarchy structure. For the sake of easier understanding, it is assumed in FIGS. 3-6 that the first hierarchy element from the interface hierarchy structure is selected by the user or the configuration program and that the method thus defines the interface hierarchy structure as the first hierarchy structure.

After the selection of the node 432 as the first hierarchy element, the method allows the selection of a second hierarchy element, which should come from the second hierarchy structure, thus in the present case should come from the function hierarchy structure. Apart from this condition, that the second hierarchy element should come from the second hierarchy structure, there are no restrictions of any sort regarding the selection of the second hierarchy element. In particular, there are no restrictions regarding the hierarchy level of the second hierarchy element. In the present example, it is assumed that the root node 6 is selected. The method receives the root node 6 as the selection of the second hierarchy element. Owing to the selection of the second hierarchy element, a second sub-hierarchy structure is defined that comprises the second hierarchy element and all hierarchy elements located below it. Since the second hierarchy element is the root node 6 in the present example, the second sub-hierarchy structure corresponds to the entire interface hierarchy structure. It is evident from this that the term sub-hierarchy structure can mean that the sub-hierarchy structure can be a portion of the entire hierarchy structure, but can also be the entire hierarchy structure. The selection of the root node 6 is likewise illustrated by a heavy outline.

After isolation of the first sub-hierarchy structure and the second sub-hierarchy structure, the method checks for what compatible connections are possible between the hierarchy elements of the first sub-hierarchy structure and the hierarchy elements of the second sub-hierarchy structure. In doing so, the method compares the particular characteristics of the available hierarchy elements. In the present example, it is determined in the exemplary method that the node 432 and the node 622 are compatible. In addition, it is determined that the node 622 is configured such that leaves 634.a and 634.b dependent on it can be newly created. On the basis of this information concerning the compatibilities of the hierarchy elements, the method automatically configures a compatible connection between the node 432 and the node 622, as well as two additional compatible connections on the lowest hierarchy level, namely between the leaf 432.a and the leaf 634.a, and between the leaf 432.b and the leaf 634.b. The hierarchy elements connected to one another by these compatible connections are illustrated with a heavy outline in FIG. 3b. The compatible connections allow the input/output interface 4 to communicate with the input/output functions 6, and thus with the model present in the testing device, at the time of the simulation.

A second exemplary method sequence according to the invention is illustrated in FIG. 4. The interface hierarchy structure from FIG. 4 is similar to the interface hierarchy structure from FIG. 3. However, the node 430 has a quantity n of leaves, where n is greater than or equal to six. The function hierarchy structure from FIG. 4 is more extensive than the function hierarchy structure from FIG. 3. Each of the two subnodes 630 and 632 as well as the node 622 has two leaves apiece. The subnode 630 has the two leaves 630.a and 630.b, the subnode 632 has the two leaves 632.a and 632.b, and the node 622 has the two leaves 634.a and 634.b.

Figure 4A:
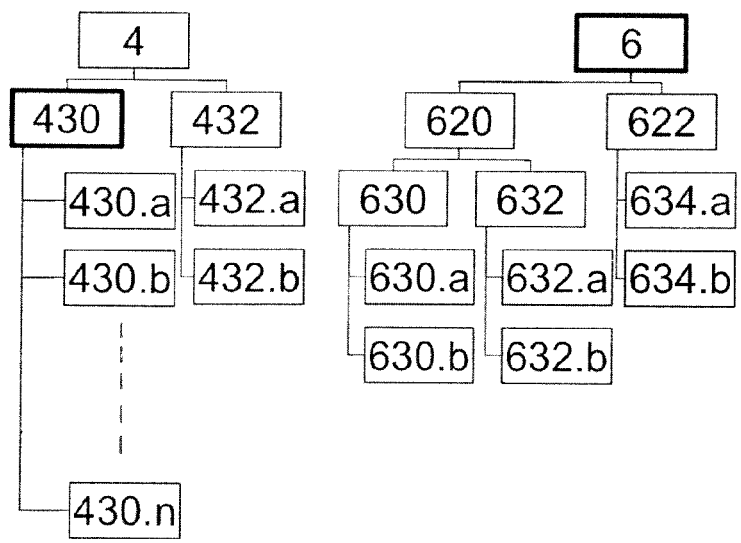
FIGS. 4a and 4b show an exemplary implementation of the method for connecting the input/output interface on the basis of the applicable interface hierarchy and function hierarchy structures.

In the exemplary method sequence from FIG. 4, the node 430 is selected as the first hierarchy element and the root node 6 is selected as the second hierarchy element, which again is illustrated by a heavy outline in FIG. 4a. Therefore, the first sub-hierarchy structure comprises the node 430 and the leaves 430.a, 430.b, . . . , 430.n. The second sub-hierarchy structure again comprises the entire function hierarchy structure.

Figure 4B:
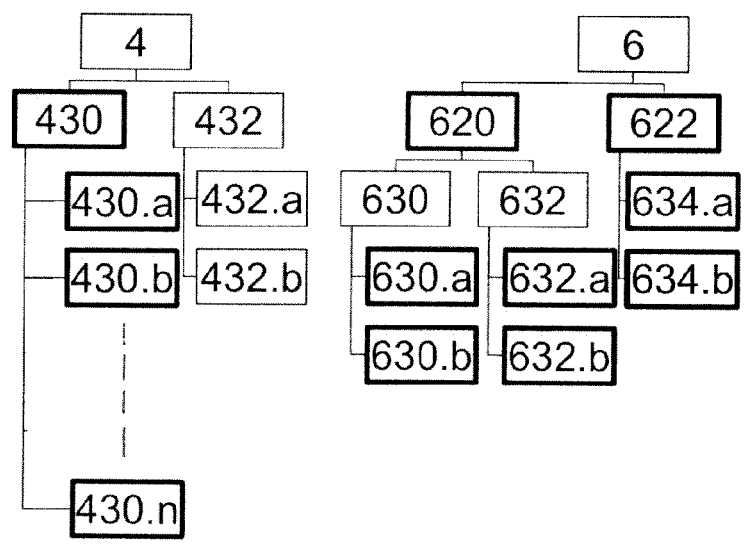

After the selection of the first hierarchy element 430 and of the second hierarchy element 6, it is established that in the present exemplary case the leaves 430.a, 430.b, . . . , 430.n are compatible with all leaves of the function hierarchy structure. Therefore, the compatible connections indicated by heavy outlines in FIG. 4b are automatically configured. In the process, the node 430 is connected to both the node 620 and to the node 622. Six more compatible connections are created on the lowest hierarchy level, to be specific between leaf 430.a and leaf 630.a, between leaf 430.b and leaf 630.*b*, between leaf 430.*c* (not shown) and leaf 632.*a*, between leaf 430.*d* (not shown) and leaf 632.*b*, between leaf 430.*e* (not shown) and leaf 634.*a*, and between leaf 430.*n* and leaf 634.*b*. It is possible in the present example for hierarchy elements that are not located on the lowest hierarchy level to be part of multiple compatible connections, such as, e.g. node 430. In contrast, hierarchy elements on the lowest hierarchy level can each be part of one compatible connection in the example described.

An iterative performance of an exemplary method according to the invention is illustrated in FIG. 5. The interface hierarchy structure from FIG. 5 corresponds to the interface hierarchy structure from FIG. 4 (cf. FIG. 5*a* and FIG. 4*a*). The function hierarchy structure in FIG. 5 corresponds to the function hierarchy structure in FIG. 3 with the exception that the subnode 630 has two leaves 630.*a* and 630.*b* (cf. FIG. 5*a* and FIG. 3*a*). The heavy outlines in FIG. 5*a* illustrate that the node 430 and the node 622 are selected as the first or second hierarchy element, respectively, in an exemplary first pass of the method. The second hierarchy structure thus has or only has the hierarchy element 622.

During determination of the compatible connections it is established from the attributes of the node 622 that exactly two hierarchy elements compatible to the leaves 430.*a* and 430.*b* can be made dependent on the node 622. As a result of this, a compatible connection between the node 430 and the node 622 and two compatible connections between the leaves 430.*a* and 634.*a* and between the leaves 430.*b* and 634.*b* are automatically configured. The compatible connections are illustrated by heavy outlines in FIG. 5*b*. This concludes the first pass of the method.

Figure 5A:
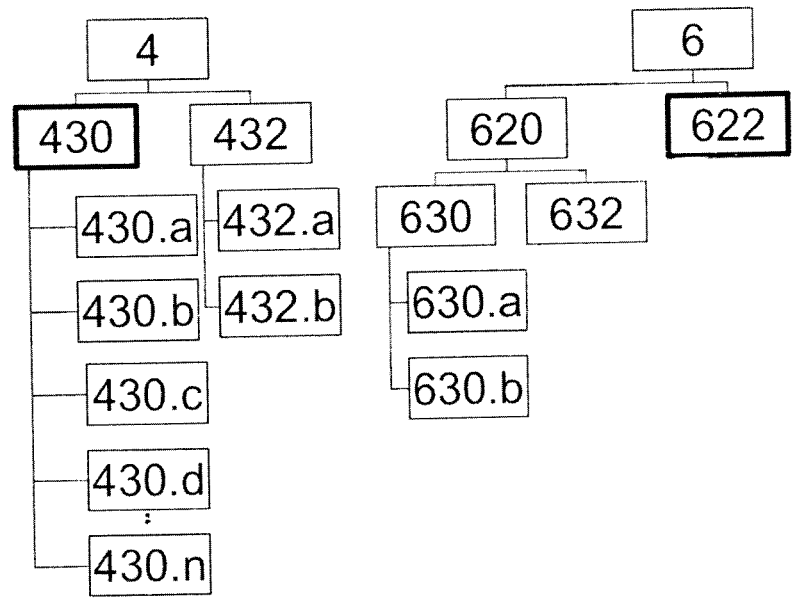
FIGS. 5a to 5d show an exemplary implementation of the method for connecting the input/output interface on the basis of the applicable interface hierarchy and function hierarchy structures.
Figure 5B:
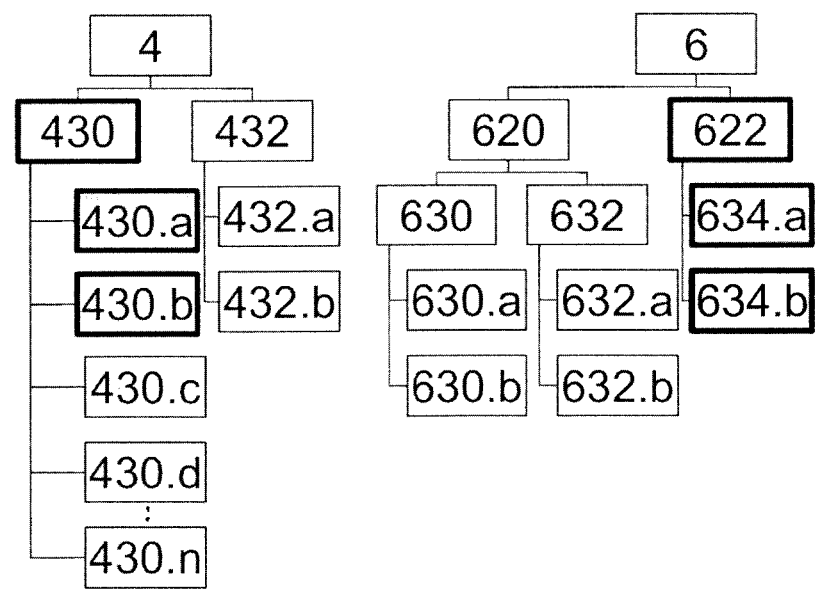
Figure 5C:
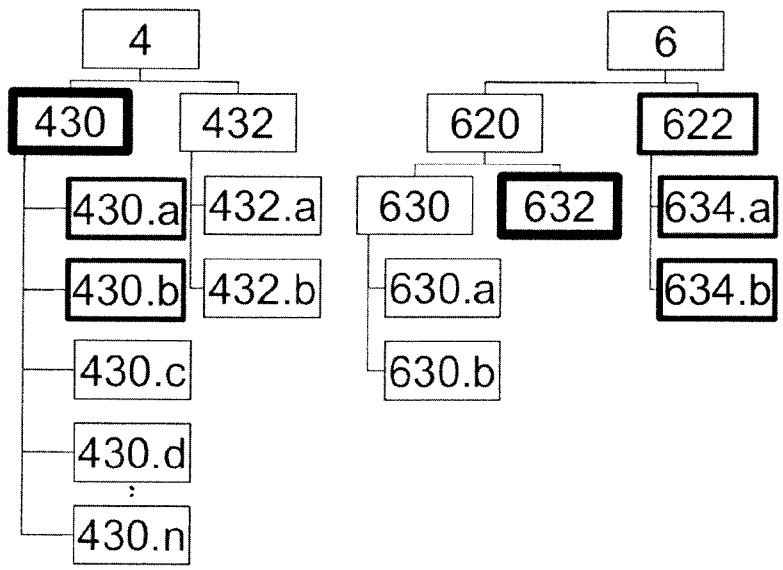
Figure 5D:
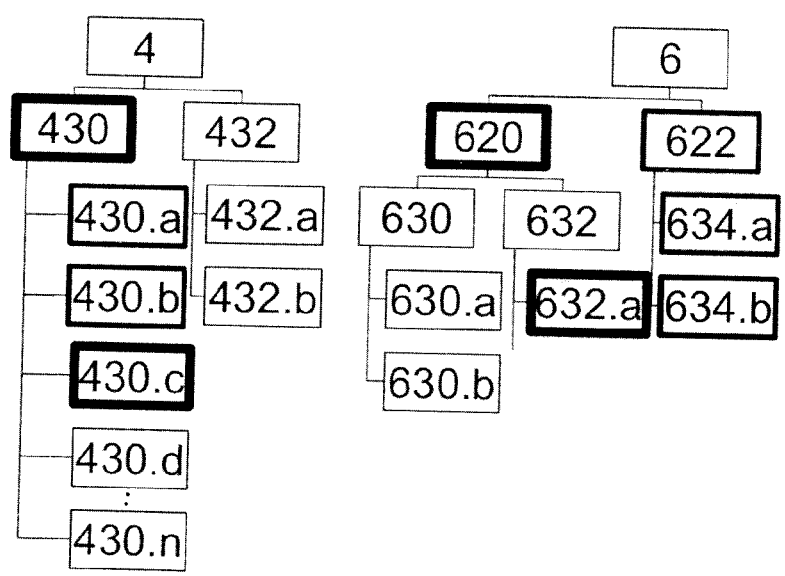

A second pass of the method subsequent to this is illustrated in FIGS. 5*c* and 5*d*. In the second pass of the method, the node 430 and the subnode 632 are selected as the first and second hierarchy elements, which is illustrated by the extra-bold outlines in FIG. 5*c*. The connections that were automatically configured in the first pass of the method continue to be represented by heavy outlines in FIG. 5*c*.

During determination of the compatible connections, it is established in the exemplary second pass of the method from FIG. 5 that that exactly one leaf, which is compatible with the leaf 430.*c*, can be made dependent on the subnode 632, which does not yet contain any leaves. This leaf, labeled 632.*a* in FIG. 5*c*, is generated, and a compatible connection between the leaf 430.*c* and the leaf 632.*a* is configured.

During determination of the compatible connections, it is additionally established that the node 620, which is located in the second hierarchy structure above the subnode 632 selected as second hierarchy element, is compatible with the node 430 present in the first sub-hierarchy structure. Even if the node 620 is located outside of the second sub-hierarchy structure, the compatible connection between the node 430 and the node 620 is created. Consequently, the node 430 is part of two compatible connections, namely part of a first compatible connection between the node 430 and the node 622, and part of a second compatible connection between the node 430 and the node 620.

The compatible connections added in the second pass of the method are illustrated by the extra-bold outlines around the hierarchy elements in question. At the end of the two passes, a set of compatible connections has been configured that is composed of the compatible connections configured in the first pass (heavy outline) and the compatible connections configured in the second pass (extra-bold outline). There could also be additional passes. For example, in a third pass the node 430 and the node 630 could be selected, by which means compatible connections between the node 430.*d* and the node 630.*a*, and between the node 430.*e* (not shown) and the node 630.*b*, could be produced.

An iterative performance of another exemplary method according to the invention is likewise illustrated in FIG. 6. The interface hierarchy structure from FIG. 6 once again corresponds to the interface hierarchy structure from FIG. 4 (cf. FIG. 6*a* and FIG. 4*a*). The function hierarchy structure from FIG. 6 corresponds to the function hierarchy structure from FIG. 3 with the exceptions that the subnode 632 has a leaf 632.*a* and that the node 622 has two leaves 634*a*. and 634.*b* (cf. FIG. 5*a* and FIG. 3*a*). In a first pass of the method, the leaf 432.*a* and the node 620 are selected as the first and second hierarchy elements, as is illustrated by the heavy outlines in FIG. 6*a*.

During determination of the compatible connections in the exemplary first pass of the method, it is established that the leaf 432.*a* would be compatible with a leaf 630.*a* to be created, which can be made dependent on the subnode 630 present in the second sub-hierarchy structure. Consequently the leaf 630.*a* is created, and a compatible connection is created between the leaf 432.*a* and the leaf 630.*a*. In addition, it is established during determination of the compatible connections that the node 432 located above the first hierarchy element is compatible with the node 620, which has been selected as a second hierarchy element. A suitable compatible connection is also configured automatically. This concludes the first pass of the method. The hierarchy elements of the configured compatible connections are marked with heavy outlines.

Figure 6A:
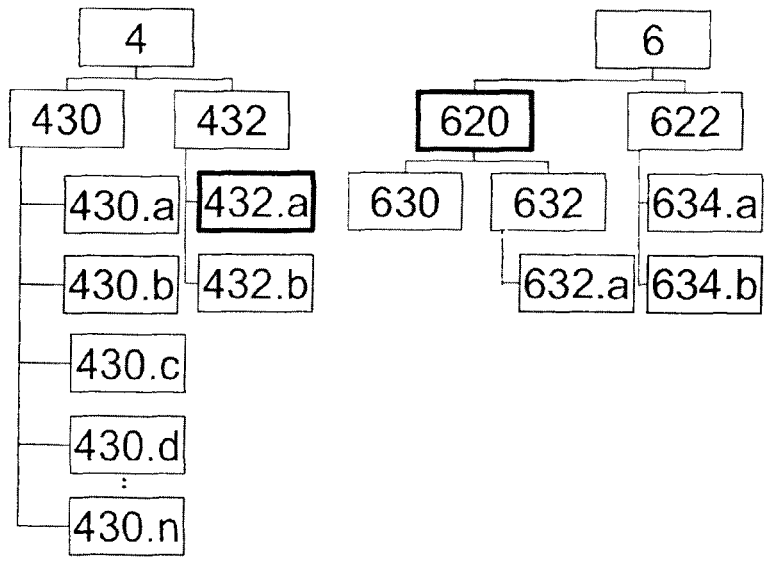
FIGS. 6a to 6d show an exemplary implementation of the method for connecting the input/output interface on the basis of the applicable interface hierarchy and function hierarchy structures.
Figure 6B:
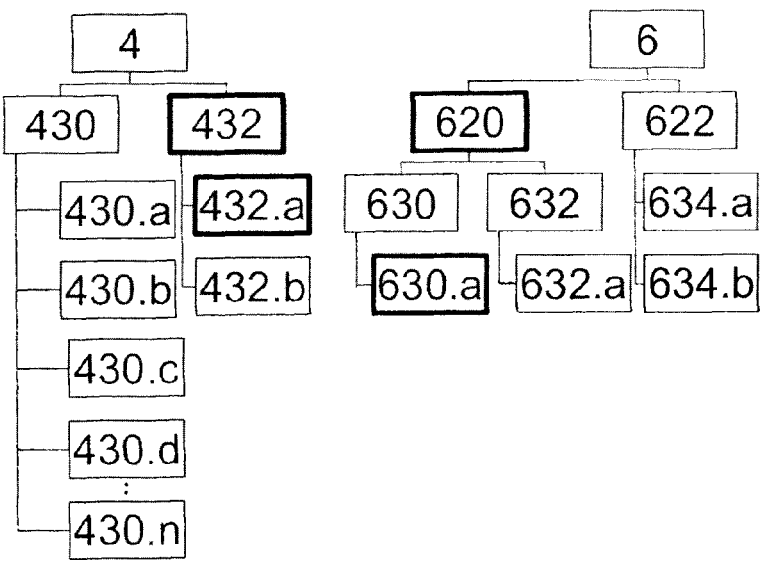
Figure 6C:
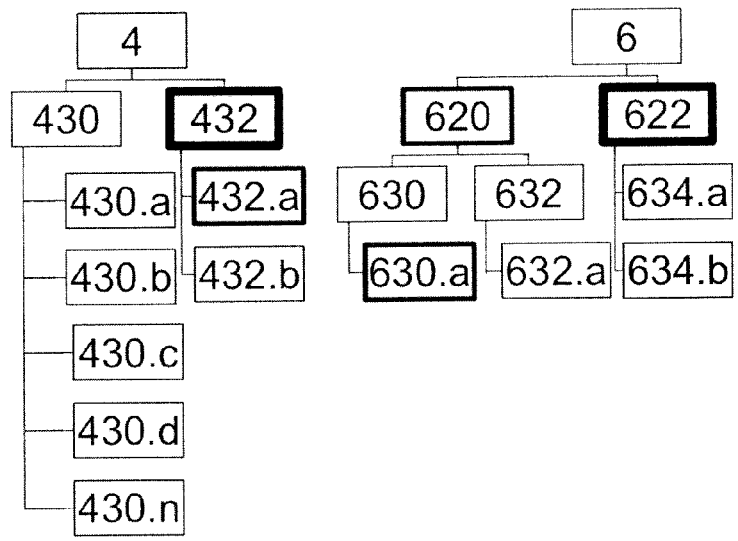
Figure 6D:
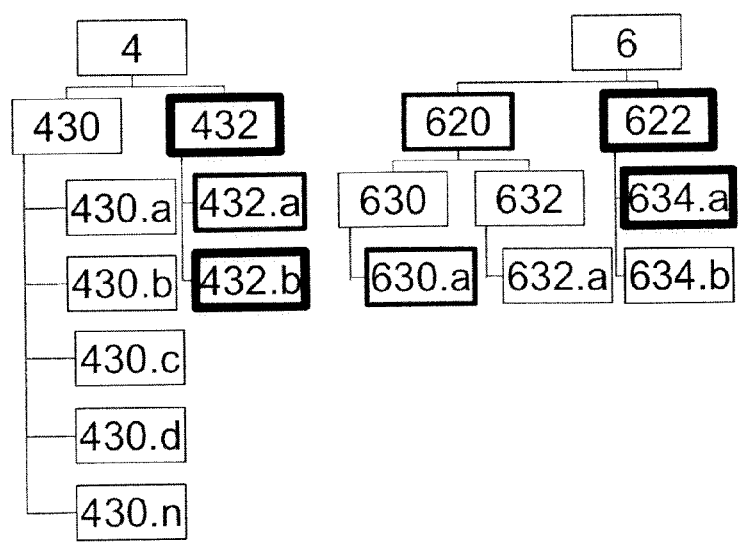

A second exemplary pass of the method is illustrated in FIGS. 6*c* and 6*d*. In the exemplary second pass of the method, the node 432 and the node 622 are selected as the first and second hierarchy elements. Therefore, the first sub-hierarchy structure is formed of the node 432 and the leaves 432.*a* and 432.*b*. The second sub-hierarchy structure is formed of the node 622 and the leaves 634.*a* and 634.*b*. The leaf 432.*a* has already been used for a compatible connection in the first pass, so it is no longer available for the configuration of another compatible connection. However, a compatible connection is possible between the leaf 432.*b* and the leaf 634.*a*, and it is automatically configured by the method. Moreover, a compatible connection is created between the node 432 and the node 622. The new compatible connections are illustrated by extra-bold outlines in FIG. 6*d*.

It would also be possible for the compatible connection between leaf 432.*a* and leaf 630.*a* from the first pass of the method to be released in the second exemplary pass of the method, and for the two leaves 432.*a* and 432.*b* to be connected to the leaves 634.*a* and 634.*b* in the second sub-hierarchy structure during the second pass of the method.

In the method described, it is also possible for a graphical aid to be provided to the user during the selection of the second hierarchy element from the second hierarchy structure. After the selection of the first hierarchy element from the first hierarchy structure it is possible, for example, for the particular hierarchy elements of the second hierarchy structure in whose sub-hierarchy structures compatible connections could be made to be highlighted in color or otherwise identified. In this way, the user can immediately concentrate on useful hierarchy elements in his selection. It is also possible for the particular hierarchy elements in whose sub-hierarchy structures no compatible connections can be made to be marked, for example by a red "X" or the like. For example, in the graphical display from FIG. 2*c* those hierarchy elements of the input/output function 6 that would not result in a compatible connection on the basis of the selection of the first hierarchy element could be crossed out. It is also possible for the method to permit or accept only one selection of the second hierarchy element when at least one compatible connection would be possible in the applicable sub-hierarchy structure.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for connecting an input/output interface of a testing device equipped for testing a control unit to a model of a technical system present in the testing device, the input/output interface adapted to connect the control unit to be tested or to connect a technical system to be controlled, and the model to be connected to the input/output interface is a model of the technical system to be controlled or a model of the control unit to be tested, the testing device further comprising a plurality of input/output functions connected to the model, the method comprising:
    (a) providing an interface hierarchy structure, which is a representation of at least a part of the input/output interface of the testing device, that has a plurality of hierarchy levels and is constructed from a first set of hierarchy elements, wherein the first set of hierarchy elements have a plurality of channels of the input/output interface that constitute the lowest hierarchy level of the interface hierarchy structure;
    (b) providing a function hierarchy structure, which is a representation of the plurality of input/output functions, that has a plurality of hierarchy levels and is constructed from a second set of hierarchy elements;
    (c) allowing a selection of an arbitrary first hierarchy element from an arbitrary first hierarchy structure, wherein the first hierarchy structure is either the interface hierarchy structure or the function hierarchy structure, and a second hierarchy structure is either the interface hierarchy structure or the function hierarchy structure not defined as the first hierarchy structure;
    (d) isolating a first sub-hierarchy structure based on the selection of the first hierarchy element, wherein the first sub-hierarchy structure comprises the first hierarchy element and the hierarchy elements located below the first hierarchy element;
    (e) allowing a selection of a second hierarchy element from the second hierarchy structure, wherein the selection of the second hierarchy element is not limited to a hierarchy level of the second hierarchy structure that corresponds to the hierarchy level of the first hierarchy element;
    (f) isolating a second sub-hierarchy structure based on the selection of the second hierarchy element, wherein the second sub-hierarchy structure comprises the second hierarchy element and the hierarchy elements located below the second hierarchy element;
    (g) determining compatible connections between hierarchy elements of the first sub-hierarchy structure and hierarchy elements of the second hierarchy structure or determining compatible connections between the hierarchy elements of the lowest hierarchy level of the first sub-hierarchy structure and the hierarchy elements of the lowest hierarchy level of the second sub-hierarchy structure; and
    (h) automatically configuring at least a part of the compatible connections so that the model present in the testing device communicates through at least the part of the compatible connections with the control unit to be tested or the technical system to be controlled.

2. The method according to claim 1, wherein all compatible connections are automatically configured.

3. The method according to claim 1, wherein the automatic configuration of connections at a higher level are performed, via which the hierarchy elements of the first sub-hierarchy structure that are located above the lowest hierarchy level and compatible hierarchy elements of the second sub-hierarchy structure that are located above the lowest hierarchy level are connected.

4. The method according to claim 3, wherein hierarchy elements that are located outside of the first sub-hierarchy structure above the first hierarchy element, and/or hierarchy elements that are located outside of the second sub-hierarchy structure above the second hierarchy element, are additionally taken utilized for the automatic configuration of connections at a higher level.

5. The method according to claim 1, wherein at least a portion of the hierarchy elements of the interface hierarchy structure and at least a portion of the hierarchy elements of the function hierarchy structure, or at least a portion of the channels and at least a portion of the hierarchy elements of the lowest hierarchy level of the function hierarchy structure have attributes, and wherein the determination of compatible connections takes place as a function of the compatibility of the attributes.

6. The method according to claim 5, wherein the compatible connections include a plurality of substantially similar connections, wherein substantially similar connections exist between channels and hierarchy elements of the lowest hierarchy level of the function hierarchy structure with the same attributes, wherein the combination of the substantially similar connections forms a compatible group connection.

7. The method according to claim 1, wherein, if there are more channels than hierarchy elements of the lowest hierarchy level in the function hierarchy structure within the first and second sub-hierarchy structures, then additional hierarchy elements of the lowest hierarchy level are generated in the function hierarchy structure, and an automatic configuration of additional compatible connections is performed using the additional hierarchy elements that are generated.

8. The method according to claim 1, wherein an arbitrary second hierarchy element is selected from the second hierarchy structure.

9. The method according to claim 1, wherein, for each of the hierarchy elements of at least a part of the second hierarchy structure, an applicable sub-hierarchy structure is isolated that comprises the applicable hierarchy element and the hierarchy elements located below the applicable hierarchy element, and at least one hierarchy element is checked for which a compatible connection to a hierarchy element of the first sub-hierarchy structure is possible and is present in the applicable sub-hierarchy structure, and wherein a selection is allowed of only those hierarchy elements for whose sub-hierarchy structure a compatible connection was established.

10. The method according to claim 1, wherein at least the steps (c) to (h) are executed in multiple passes, wherein compatible connections from an earlier pass are no longer available for a later pass.

11. The method according to claim 1, wherein at least the steps (c) to (h) are executed in multiple passes, wherein depending on the selection of the first and of the second hierarchy elements, step (h) has at least one occurrence of the following steps: deletion of at least one old compatible connection configured in an earlier pass, and configuration of at least one new compatible connection, wherein at least one hierarchy element of the old compatible connection is used for a new compatible connection.

12. The method according to claim 1 for testing a control unit with a testing device equipped for testing the control unit, the method further comprising:

connecting the input/output interface of the testing device to the model; and performing a simulation in which the model present in the testing device communicates with the control unit to be tested or the technical system to be controlled through the compatible connections that were automatically configured.

13. The method according to claim 1, wherein a computer program product and a computer program stored on a non-transitory computer readable medium executes the method for connecting the input/output interface of the testing device.

14. The method according to claim 1, the testing device performing the method steps (a) through (h), wherein the testing device is equipped for testing the control unit, has the input/output interface for connecting the control unit to be tested or for connecting the technical system to be controlled, and has the model of the technical system to be controlled or of the control unit to be tested as well as the plurality of input/output functions connected to the model.

15. The method according to claim 1, an external computing device performing the method steps (a) through (h), wherein the testing device and the external computing device are connected, wherein the testing device is equipped for testing the control unit, has the input/output interface for connecting the control unit to be tested or for connecting the technical system to be controlled, and has the model of the technical system to be controlled or of the control unit to be tested as well as the plurality of input/output functions connected to the model.

16. The method according to claim 15, wherein the external computing device is a computer, tablet, or mobile telephone.

* * * * *